Patented Dec. 29, 1953

2,664,362

UNITED STATES PATENT OFFICE 2,664,362

BITUMINOUS PRODUCT SURFACED WITH MINERAL GRANULES AND PROCESS OF MAKING SAME

Morton C. Higgs, Whittier, Calif., and George Hartwright, Chicago, Ill., assignors to United States Gypsum Company, Chicago, Ill., a corporation of Illinois No Drawing. Application March 3, 1948, Serial No. 12,888

19 Claims. (Cl. 117—27)

This invention relates to a coated granule and a method of manufacturing the same. More particularly this invention relates to a coated granule which has improved properties with respect to adhesion to an asphalt surface.

In the preparation of a roofing or siding material by the conventional method of saturating a fibrous felt with asphalt, subsequently coating the saturated felt with an asphalt layer, and thereafter covering the asphalt coating with mineral granules, considerable difficulty has been experienced in the past with the proper adhesion of the mineral granules to the coating. Failure of proper adhesion is particularly noticeable if water is employed in the processing step or when the final product is subjected to the usual weathering conditions. Failure of adhesion may be particularly apparent if the mineral granules are of the synthetic type such as those prepared by covering a mineral base with a baked-on alkaline silicate coating or an inorganic phosphate coating.

Accordingly it is one object of this invention to provide a mineral granule which has improved properties with respect to adhesion to an asphalt surface.

A further object of this invention is to provide a synthetic mineral granule having improved asphalt-adhering qualities.

A further object of this invention is the provision of a method for treating natural or synthetic mineral granules in such a manner that their ability to adhere to an asphalt surface will be markedly improved.

A still further object of this invention is the provision of a granule-coated asphalt sheet composition which has improved properties with respect to granule erosion in the presence of water.

Further and additional objects will appear from the following description and the accompanying claims.

The present invention is particularly useful in connection with the preparation of asphalt products, such as roofing or siding, wherein mineral granules are applied to and embedded in an asphalt coating in order to provide a suitable protective layer for the asphalt. The invention is particularly useful in a manufacturing process in which water is applied to the surface of the asphalt product after the granules have become embedded therein whereby to cool the roofing or siding in order to prevent sticking and to permit ready handling. However, this invention is not to be limited to products of this particular character since it may be applicable to any type of asphalt composition having an exposed asphalt layer in which are embedded mineral granules.

In the manufacture of asphalt roofing as commonly practiced at the present time, a composite sheet of fibrous material coated with asphalt is first formed and mineral granules are pressed into the surface of the hot thermoplastic asphalt coating whereby the granules are at least partially embedded in the asphalt and are adhered thereto. In the usual plant practice cool water is applied to the surface of the resulting composite sheet after granule addition for the purpose of cooling the sheet and preventing sticking. Some of this water contacts the freshly applied granules and they, particularly when prepared from a mineral base having a sintered alkaline silicate layer, have in general a greater affinity for water than for the asphalt. Accordingly certain of the embedded granules may have a tendency to become wetted by the water resulting in an adverse effect upon the adherent bond of the granule to the asphalt surface. This phenomenon, along with the subsequent abrasive action which may result from further processing and handling of the product, causes a considerable number of granules to loosen and as a result the quality of the product is decreased. As indicated above, this is particularly true when the granules are produced by applying an alkaline silicate surface to a mineral base together with certain other minerals in order to impart color. Also the weather resistance of granule-coated asphalt roofing and siding has not always been everything that could be desired. Because of the more or less hydrophilic properties of the mineral granules they have a tendency to become wetted by water on exposure to the elements, thereby loosening the bond between the granules and the asphalt.

In accordance with this invention it has been discovered that the ability of mineral granules to adhere to an asphalt surface may be markedly improved if the granules are first coated with a film of tall oil, either crude or refined, which is subsequently baked as a film on the surface of the granule prior to the time that the granule is embedded in a softened asphalt or bituminous surface. It has been discovered that when the granules are coated with a film of baked-on tall oil, they will to a large extent lose their hydrophilic tendency and adhesion of the granules to the asphalt or bituminous surface is very greatly enhanced. Thus water which may contact the final product during the manufacturing process or during weathering of the final product does not have a tendency to loosen the granules adhered to the asphalt, and an improved product results. Tall oil has been found to be particularly useful in this connection since it does not contribute to the phenomenon known as "sooting" in the final product. By "sooting" is meant the tendency of the granules to collect dirt during normal exposure to the atmosphere, particularly in large cities.

By tall oil as used in this specification is meant the acidified oleaginous liquid obtained from black liquor, a product of the kraft pulp industry. Tall oil consists essentially of fatty and rosin acids and minor amounts of other substances, such as the sterols, higher alcohols, etc. The tall oil may or may not be diluted with a solvent before adding to the granules. However, it has been found that for the sake of more uniform distribution and to hold the thickness of the resulting film of the granule to a minimum, it is desirable to heat the tall oil before applying to the granule. If crude tall oil is used, heating is also desirable to dissolve any suspended matter that may be contained therein. In accordance with this invention, it has been found that the best results are obtained if the tall oil is applied to the granules under conditions to produce a final granular product containing a baked-on film of tall oil. This desired result may be effected either by heating the granules to the desired temperature before the tall oil is applied or first applying the tall oil and then heating the granules. At the present time it is not clear why it is necessary to heat the granules and the tail oil together, but it has been found that if the mixture is not heated or if it is heated to a temperature below about 250° F., then the effectiveness of the tall oil is reduced and poor granule adhesion to asphalt may be experienced.

The baking temperature of the tall oil granule mixture should be as high as possible but below a temperature which will result in the destruction of the tall oil. Obviously care should be exercised to prevent fires if the temperature of baking is above the flash point (i. e. about 416° F.). A satisfactory temperature for baking has been found to be about 350° F. for at least two minutes. When the tall oil is added to the granules and during the subsequent baking operation, it is usually desirable to agitate the granules in any desired manner, such as by tumbling. Generally speaking, 0.5 per cent by weight of tall oil based on the total weight of the mineral granules is a preferred concentration of tall oil used. It will be obvious that this can be varied within wide limits so long as a suitable film is applied to the surface of the granule. However, in general, the proportions of tall oil should fall within the range of between about 0.2 and 2.5 per cent of the mineral granules. As indicated above, crude tall oil can be used if desired. However, it is preferred to use a refined tall oil since the results are somewhat better and there is less trouble with suspended material plugging up spray nozzles, etc.

For a more complete understanding of this invention, reference will now be made to specific examples showing methods for preparing products in accordance with this invention. It will be readily apparent to one skilled in the art that various modifications and substitutions may be made without departing from the spirit and scope of this invention as defined in the appended claims.

*Example I*

In order to prepare a silicate-coated granule which is markedly improved with respect to its adhesion properties on an asphalt surface in accordance with this inventiaon, any suitable base rock may be selected for producing the granules. For example, a nontransparent gray quartzite in the form of granules may be employed. To one ton of base granules of this character are added 100 pounds of sodium silicate solution (ratio of $Na_2O$ to $SiO_2$ about 1 to 3.25), 25 pounds of a filler clay, such as kaolin, and 10 to 30 pounds of a color pigment, such as iron oxide or chromium oxide, depending upon the color desired. The mixture is agitated until the granules are well covered and thereafter dried at a low temperature. After drying, the granules are sintered up to a temperature between 900° and 1000° F., in a period of about 20 minutes to provide a colored alkaline silicate coating over the surface of the base granules. The granules are then cooled sufficiently so that tall oil in the amount of about 0.5 per cent by weight of the granules can safely be added without danger of fire, usually not below about 250° F. and preferably above 350° F. The hot granules and tall oil are agitated by tumbling for a period of in excess of two minutes and the granules are then cooled slowly and are ready to use. The heat treatment with the tall oil causes the tall oil to form an overlying film on the granules which is baked thereon.

The resulting granules coated with a film of baked tall oil may then be applied to a composite sheet having a hot thermoplastic asphalt coating in accordance with any of the methods that are well recognized in the art and the granule coated product is treated with water to cool the surface and reduce stickiness. The application of mineral granules to products of this character is well known and it is not believed necessary to describe them here. The baked-on tall oil film on the granules substantially prevents loosening of the granules during the water treatment step and during weathering of the final product. The final product may be rolled or cut into any desired form or shape suitable for sale.

*Example II*

In order to prepare a phosphate-coated granule which is markedly improved with respect to its adhesive properties on an asphalt surface, a phosphate-coated granule, such as the brilliant green phosphate-coated granule made by Central Commercial Company was selected. Granules of this character and their method of formation are disclosed in United States Patents Nos. 2,057,678, 2,057,679 and 2,133,728. Tall oil is applied and baked on to the surfaces of these phosphate-coated granules in the same manner as indicated above in connection with Example I.

The baked-on tall oil coated granule of this invention has improved adhesion qualities with respect to asphalt regardless of whether the roofing or siding is cooled with water or air during the manufacturing process. The most spectacular results are obtained when water is used for cooling though definite improved results are obtained when air is used for cooling.

While the usual practice in the manufacture of roofing is to saturate a paper and/or rag felt with asphalt, apply an asphalt coating thereto, and thereafter embed the granules therein, it is not the intention herein to limit this invention to such a particular product. If desired, the felt may be made of inorganic fibers, such as asbestos, mineral wool, glass wool, and the like. Also the felt need not be saturated with asphalt prior to the application of the asphalt coating, or, if desired, the base sheet may be made by felting an asphalt fiber mixture. Also the mineral granules to be treated with the tall oil may be either natural or synthetic. If synthetic granules are used, as described above, the silicate or phosphate coating thereon and method of applying the same may be varied within wide ranges as will readily be apparent to one skilled in the art. Various proportions of silicate, phosphate, color pigments and/or filler may be used as will readily be apparent to one skilled in the art. Likewise inorganic hardened coatings other than phosphates and silicates are contemplated when granules of the synthetic type are prepared.

In the example indicated above, the invention has been disclosed as directed towards the production of granule covered asphalt roofing. However, it is not the intention to be limited thereto since improved results may be obtained by applying granules prepared in accordance with this invention to any product in which granules are adhered to an asphalt or bituminous coating such, for example, as insulated asphalt brick siding, flooring, and the like.

While particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A process of preparing mineral granules having improved asphalt-adhering properties which comprises coating mineral granules with an inorganic heat hardenable mineral in an amount adjusted to form a film on said granules, heating the coated granules to a temperature sufficient to sinter said film, cooling the granules to a temperature above about 250° F. but below the decomposition temperature of tall oil, admixing tall oil in an amount between about 0.2 and 2.5 per cent by weight with the thus cooled granules, maintaining the temperature above about 250° F. for a period to bake said tall oil on said granules, and thereafter cooling said granules.

2. The process recited in claim 1 wherein said inorganic heat hardenable material is an alkaline silicate.

3. A bituminous sheet product having mineral granules partially embedded in and adhered to one surface thereof, said mineral granules having a surface film of baked tall oil thereon.

4. An asphalt sheet product having mineral coated mineral granules partially embedded in and adhered to at least one surface thereof, said mineral granules having a surface film of baked tall oil thereon interposed between the asphalt and the mineral coating whereby adherence of the granules to the asphalt is improved.

5. The asphalt sheet product recited in claim 4 wherein the amount of baked tall oil present is between about 0.2 per cent and 2.5 per cent of the total weight of the mineral granules.

6. The product recited in claim 4 wherein said mineral coating comprises an alkaline silicate.

7. The product recited in claim 4 wherein said mineral coating comprises an inorganic phosphate.

8. In a process of preparing a granule-coated asphalt sheet involving the steps of embedding mineral granules in a heat-softened asphalt surface and thereafter cooling the resulting surface whereby to harden the asphalt, the improvement of applying to said mineral granules a baked coating of tall oil prior to the embedding step.

9. The process recited in claim 8 wherein the cooling step is effected with water.

10. The product recited in claim 3 wherein said film is baked on said granules at above about 250° F. in the absence of water.

11. The product recited in claim 4 wherein said film is baked on said granules at above about 250° F. in the absence of water.

12. The process recited in claim 8 wherein the coating of tall oil is baked on said granules at a temperature of above about 250° F. in the absence of water.

13. The process recited in claim 1 wherein said inorganic heat hardenable material is an inorganic phosphate.

14. The product recited in claim 3 wherein the amount of baked tall oil present is between about 0.2 and about 2.5 per cent of the total weight of the mineral granules.

15. An asphalt sheet product having mineral granules only partially embedded in and firmly adhered to at least one surface thereof, said mineral granules having a surface film of baked tall oil interposed between the granules and the asphalt whereby adherence of the granules to the asphalt is improved.

16. A process of preparing a granule-coated asphalt sheet which comprises heating a body of mineral granules with tall oil to a temperature above about 250° F. for a period to bake a film of tall oil on the granules, thereafter partially embedding the thus coated granules in a heat-softened asphalt surface of said sheet whereby to provide an adherent granule coating, and thereafter cooling the surface to harden the asphalt.

17. The process recited in claim 16 wherein the cooling step is effected with water.

18. A process of preparing mineral granules having improved asphalt-adhering properties which comprises coating mineral granules with an inorganic heat-hardenable mineral substance in an amount adjusted to form a film on said granules, heating the thus coated granules to a temperature sufficient to sinter said film, cooling the granules, applying thereto from about 0.2% to about 2.5% by weight of tall oil and baking the resulting coating of tall oil onto the granules by heating them to a temperature above about 250° F. for a time sufficient to bake on said tall oil.

19. Process of producing a roofing material which comprises applying to a hot and hence still plastic asphalt coating on roofing felt stock mineral granules having a coating prepared in accordance with the process of claim 18, and cooling said granules and asphalt coating with water to harden the asphalt whereby the granules thereon are tightly held to the asphalt coating.

MORTON C. HIGGS.
GEORGE HARTWRIGHT.

References Cited in the file of this patent

UNITED STATES PATENTS

| Number | Name | Date |
|---|---|---|
| 2,061,338 | Ward | Nov. 17, 1936 |
| 2,164,329 | Jewett | July 4, 1939 |
| 2,259,879 | Denning | Oct. 21, 1941 |
| 2,261,638 | Beach | Nov. 4, 1941 |
| 2,282,479 | Johnston | May 12, 1942 |
| 2,286,244 | Whitacre | June 16, 1942 |
| 2,294,523 | Veazey | Sept. 1, 1942 |
| 2,345,191 | Gage | Mar. 28, 1944 |
| 2,374,741 | Gage | May 1, 1945 |
| 2,411,634 | Pearson | Nov. 26, 1946 |
| 2,595,465 | Keene et al. | May 6, 1952 |